(12) United States Patent  
Iwasaki

(10) Patent No.: US 6,518,967 B1  
(45) Date of Patent: Feb. 11, 2003

(54) GAME APPARATUS, GAME METHOD, AND COMPUTER-READABLE STORAGE MEDIUM

(75) Inventor: Tetsuji Iwasaki, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/537,985

(22) Filed: Mar. 29, 2000

(30) Foreign Application Priority Data

Mar. 31, 1999 (JP) .......................................... 11-093314

(51) Int. Cl.[7] .............................................. G06T 15/00
(52) U.S. Cl. ...................................................... 345/426
(58) Field of Search .............................. 345/426, 421, 345/422, 588, 582, 545; 463/33

(56) References Cited

U.S. PATENT DOCUMENTS

| | | | |
|---|---|---|---|
| 4,646,078 A | * 2/1987 | Knierim et al. ............. | 345/545 |
| 5,870,102 A | * 2/1999 | Tarolli et al. ............... | 345/586 |
| 6,037,948 A | * 3/2000 | Liepa ......................... | 345/582 |
| 6,234,901 B1 | * 5/2001 | Nagoshi et al. ............. | 463/33 |
| 6,256,040 B1 | * 7/2001 | Tanaka et al. .............. | 345/421 |

FOREIGN PATENT DOCUMENTS

| | | |
|---|---|---|
| JP | 06176168 A | 6/1994 |
| JP | 08063616 A | 3/1996 |
| JP | 08-215432 | 8/1996 |
| JP | 08-249479 | 9/1996 |

* cited by examiner

*Primary Examiner*—Phu K. Nguyen
(74) *Attorney, Agent, or Firm*—Moser, Patterson & Sheridan, L.L.P.

(57) ABSTRACT

A game apparatus for display of a game image in which a moving body moves in a virtual space is provided. The game apparatus comprises: a polygon data memory for storing polygon data which define shapes of polygons constituting the moving body; a texture image memory for storing a texture image which indicates a reflected state of ambient light; a position specifying unit for specifying a position of the moving body in the virtual space; and a first image drawing unit for drawing a polygon based on the position of the moving body and the polygon data; a determination unit for determining a part of the texture image stored in the texture image memory based on the specified position of the moving body; and a second image drawing unit for drawing a translucent polygon over the polygon of the moving body, the translucent polygon having pasted thereon the part of the texture determined by the determination unit.

13 Claims, 11 Drawing Sheets

55

| VERTEX - COORDINATE TABLE | | |
|---|---|---|
| INDEX | VERTEX COORDINATES | NORMAL VECTOR |
| 0 | ( x0, y0, z0 ) | (nx0, ny0, nz0 ) |
| 1 | ( x1, y1, z1 ) | (nx1, ny1, nz1 ) |
| 2 | ( x2, y2, z2 ) | (nx2, ny2, nz2 ) |
| 3 | ( x3, y3, z3 ) | (nx3, ny3, nz3 ) |
| 4 | ( x4, y4, z4 ) | (nx4, ny4, nz4 ) |

| REFLECTION FLAG TABLE | |
|---|---|
| POLYGON | REFLECTION FLAG |
| 0 | 1 ( REFLECTION POLYGON ) |
| 1 | 1 ( REFLECTION POLYGON ) |
| 2 | 0 ( NON - REFLECTION POLYGON ) |
| 3 | 0 ( REFLECTION POLYGON ) |
| 4 | 0 ( NON - REFLECTION POLYGON ) |

| VERTEX - REFLECTION TEXTURE UV COORDINATE TABLE ||
|---|---|
| VERTEX INDEX | UV COORDINATES |
| 0 | ($U_D$, $V_D$) (DUMMY DATA) |
| 1 | ($U_D$, $V_D$) |
| 2 | ($U_D$, $V_D$) |
| 3 | ($U_D$, $V_D$) |
| 4 | ($U_D$, $V_D$) |

| VERTEX - SCREEN COORDINATE TABLE ||
|---|---|
| INDEX | SCREEN COORDINATES |
| 0 | ($X_D$, $Y_D$) (DUMMY DATA) |
| 1 | ($X_D$, $Y_D$) |
| 2 | ($X_D$, $Y_D$) |
| 3 | ($X_D$, $Y_D$) |
| 4 | ($X_D$, $Y_D$) |

FIG. 9

GAME APPARATUS, GAME METHOD, AND COMPUTER-READABLE STORAGE MEDIUM

BACKGROUND OF THE INVENTION

1. Field of the Invention

The present invention relates to a game apparatus and a game method for displaying a moving body on a game screen, and a computer-readable storage medium storing a program for causing a computer to act as such game apparatus.

2. Related Background Art

It is common practice to present virtual three-dimensional display by polygons in the field of recent games, particularly, in the field of race games. To improve the quality of the game screen, the games with such virtual three-dimensional display by polygons usually employ a technique of pasting an image preliminarily prepared for the polygons (i.e. texture mapping), on a model (an assembly of many polygons), such as a car manipulated by a player.

In connection with the above technology, Japanese Patent Application Laid-Open No. Hei 8-63616 describes a technique for providing the game screen with realism by storing a plurality of textures for one display object and appropriately switching between the textures according to circumstances of the display object. Use of this technique can provide the image comprised of polygons with dynamic change, but, for further addition of dynamic presentation, more texture images must be stored for each polygon. However, when this technique of switching between the texture images was used for expressing reflective light of a road lamp which is reflected on a car in the race games, it is difficult to express continuous change of a number of texture images required for each polygon.

SUMMARY OF THE INVENTION

An object of the present invention is to provide a game apparatus, a game method, and a computer-readable storage medium capable of expressing the continuous change of the image on the polygons particularly, the continuous change of reflective light reflected on the display object or the like.

One aspect of the present invention provides a game apparatus for displaying a game image having a moving body moving in a virtual space, the game apparatus comprising, a polygon data memory for storing polygon data which define shapes of polygons constituting the moving body, a texture image memory for storing a texture image which indicates a reflected state of ambient light, a position specifying unit for specifying a position of the moving body in the virtual space, and a first image drawing unit for drawing a polygon based on the position of the moving body and the polygon data, a determination unit for determining a part of the texture image stored in the texture image memory based on the specified position of the moving body, and a second image drawing unit for drawing a translucent polygon over the polygon of the moving body, the translucent polygon having pasted thereon the part of the texture determined by the determination unit.

The game apparatus of this structure may display a pattern of ambient light moving according to movement of the moving body in the virtual space, on the surface of the moving body, whereby display screens provide increased realism.

In realizing the game apparatus of the present invention, polygon data memory may store the polygon data to define the shapes of the polygons by coordinates of respective vertices and normal vectors at the respective vertices.

The invention also provides a game apparatus in which reflection of curved part also appears with increased realism.

In realizing the game apparatus of the present invention, the texture image memory may store a texture image in which a plurality of pixels are equal to each other at places spaced by a first predetermined distance in a first predetermined direction and in which a plurality of pixels are equal to each other at places spaced by a second predetermined distance in a second predetermined direction, and the game apparatus may further comprises computing unit for calculating reference coordinates, based on the position specified position, utilizing a procedure of yielding identical results at regular intervals in each change of the position along the first predetermined direction by the first predetermined distance and each change of the position along the second predetermined direction by the second predetermined distance and additionally the second image drawing unit may determine the portion of the texture image pasted on the translucent polygon, based on the reference coordinates calculated by the computing unit.

A game apparatus according to another aspect of the present invention is a game apparatus for displaying a game image in which a moving body moves in a virtual space, wherein the moving body is displayed in a form in which a translucent image indicating a reflected state of ambient light is superimposed on a surface of the moving body and in which the reflected state of ambient light moves in accordance with movement of the moving body.

Another aspect of one invention is a game image display method for displaying a moving body moving in a virtual space. The game method comprises specifying a position of the moving body in the virtual space, and drawing a polygon based on the specified position of the moving body and polygon data defining shapes of a plurality of polygons constructing the moving body, and drawing, over a predetermined polygon of the moving body, a translucent polygon having the same shape as the predetermined polygon, wherein the translucent polygon includes a texture image indicating a reflected state of ambient light pasted thereon according to the specified position.

Another aspect of the invention provides a computer readable recording medium containing a program for causing a computer to display a game image in which a moving body moves in a virtual space, wherein the program causes the computer to perform the process comprising specifying a position of the moving body in the virtual space, and drawing a polygon based on the specified position of the moving body and polygon data defining shapes of a plurality of polygons constructing the moving body, and drawing, over a predetermined polygon of the moving body, a translucent polygon having the same shape as the predetermined polygon, wherein the translucent polygon includes a texture image indicating a reflected state of ambient light pasted thereon according to the specified position.

The computer-readable storage medium of the invention causes a computer to act as the game apparatus of the present invention described above.

Another aspect of the invention provides a computer data signal embodied in a transmission medium, the computer data signal containing a game program for displaying a game image in which a moving body moves in a virtual space, wherein the game program causes a computer to perform a process comprising, specifying a position of the moving body in the virtual space, and drawing a polygon based on the specified position of the moving body and polygon data defining shapes of a plurality of polygons constructing the moving body, and drawing, over a predetermined polygon of the moving body, a translucent polygon having the same shape as the predetermined polygon, wherein the translucent polygon includes a texture image indicating a reflected state of ambient light pasted thereon according to the specified position.

Another aspect of the invention provides a computer program product for displaying a game image in which a moving body moves in a virtual space, the computer program product comprising, computer code for specifying a position of the moving body in the virtual space, and computer code for drawing a polygon based on the specified position of the moving body and polygon data defining shapes of a plurality of polygons constructing the moving body, and computer code for drawing, over a predetermined polygon of the moving body, a translucent polygon having the same shape as the predetermined polygon, wherein the translucent polygon includes a texture image indicating a reflected state of ambient light pasted thereon according to the specified position.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 6 is an explanatory diagram to explain the vertex-coordinate table used in the game apparatus according to the embodiment;

FIG. 7 is an explanatory diagram to explain the reflection flag table used in the game apparatus according to the embodiment;

FIG. 8 is an explanatory diagram to explain the vertex-reflection texture UV coordinate table used in the game apparatus according to the embodiment;

FIG. 9 is an explanatory diagram to explain the vertex-screen coordinate table used in the game apparatus according to the embodiment;

DETAIL DESCRIPTION OF THE PREFERRED EMBODIMENTS OF THE INVENTION

Embodiments of the present invention will be described below in detail by reference to the drawings.

Figure 1:
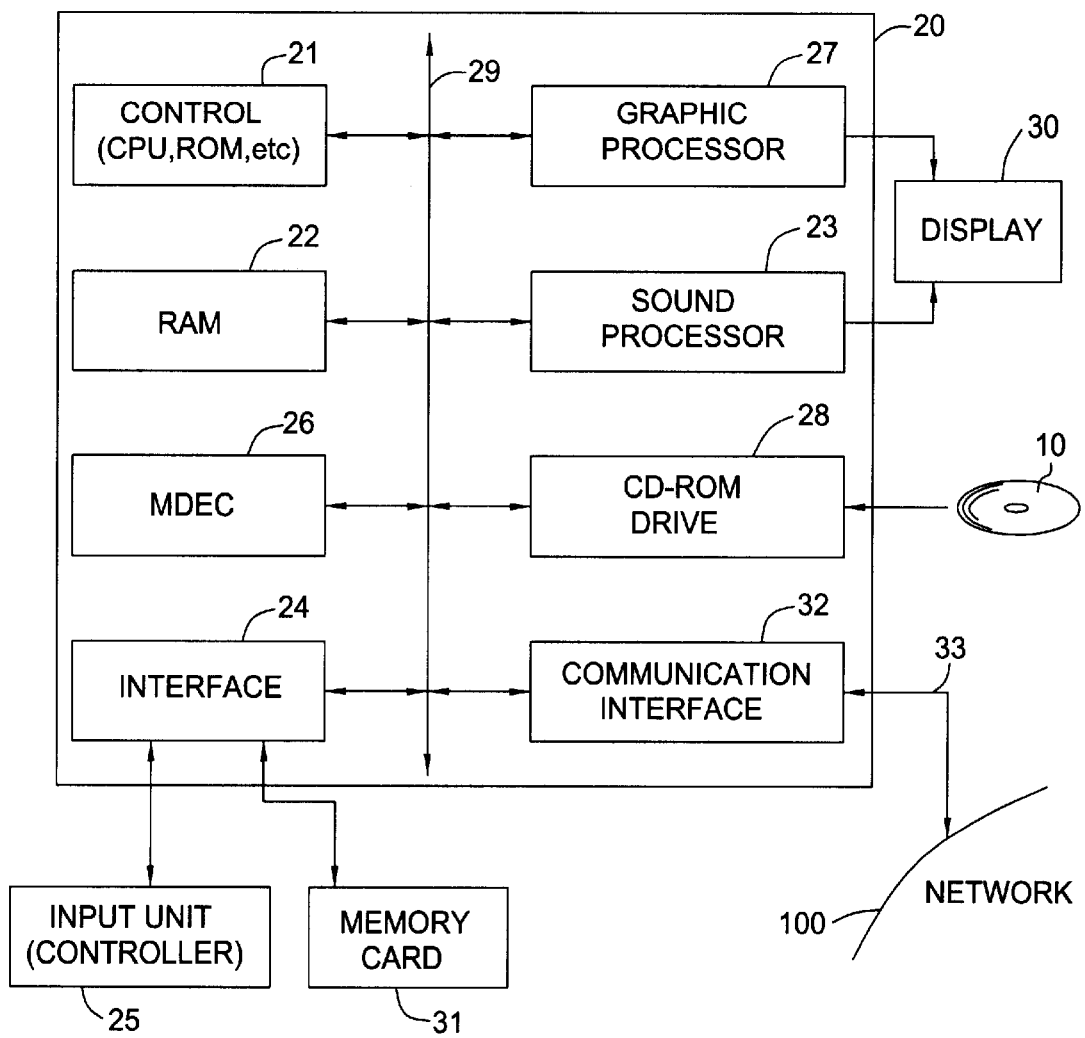
FIG. 1 is a block diagram to show the schematic structure of the game apparatus according to an embodiment of the present invention.

FIG. 1 illustrates the hardware structure of a game apparatus 20 used in a game system according to one embodiment of the present invention. As illustrated, the game apparatus 20 includes a control section 21, a RAM (Random Access Memory) 22, a sound processing section 23, an interface section 24, an MDEC 26 (Motion Decoder; data expanding engine), a graphic processor 27, a CD-ROM (Compact Disk Read Only Memory) drive 28, a bus 29, and a communication interface 32. These constituent elements are connected to each other via the bus 29.

The control section 21 is a circuit comprised of a CPU, a ROM, etc., and the CPU controls each section according to programs stored in the RAM 22 (or in the ROM in certain cases). The sound processing section 23 is connected via a bus to an output device 30. The sound processing section 23 is a circuit having the function of generating music, sound effect, etc., which provides sound output based on data stored in the RAM 22 under control of the control section 21, thereby making loudspeakers (not illustrated) of the output devices 30 generate sound according to the sound output.

An input device or controller 25 is an instrument used by a user to enter various information (instructions) into the game apparatus 20. The input device 25 is connected via the interface section 24 to the bus 29. A memory card 31 can also be connected to the interface sections 24. The interface section 24 is a circuit which performs control of timing of data transmission between the circuits (mainly, the control section 21) connected to the bus 29 and the input device 25 or the memory card 31. The components of the game apparatus 20 except for the input device 25 are typically housed in a case, and the input device 25 is constructed as an instrument (an instrument called a controller or a control pad) connected to the case by a cable.

The MDEC 26 is a circuit capable of carrying out the inverse DCT (discrete cosine transformation) operation at high speed, and is used on the occasion of expanding data (image data and moving picture data compressed and recorded in the CD-ROM 10) compressed by a method such as JPEG (Joint Photographic Experts Group) or MPEG (Moving Picture Expert Group).

The graphic processing section 27 is a circuit equipped with a frame buffer. The GPS 27 draws polygons, after subjected to a paste operation of texture, etc., on the frame buffer, based on the data (the details of which will be described hereinafter) stored in the RAM 22, in response to a predetermined command from the control section 21. The graphic processing section 27 generates and outputs a video signal according to image information stored in the frame buffer. The graphic processing section 27 also executes a process of outputting a video signal according to the result of the expansion by the MDEC 26. The game apparatus 20 is connected via this graphic processing section 27 to a display or output device 30, and a picture according to the video output from the graphic processing section 27 is displayed on a display screen (not illustrated) of the output device 30.

The communication interface 32 is a circuit for information exchange with another device on a network 100, and is connected via a communication line 33 to the network 100. The CD-ROM drive 28 is a reading device for the CD-ROM 10 of a storage medium which stores programs, data, etc. are developed for this apparatus, and the game apparatus according to the embodiment is substantiated by making the control section 21 execute control according to the program recorded in the CD-ROM 10.

The operation of the game apparatus according to the embodiment will be described below. First, the general operation of this game apparatus will be described briefly.

The game apparatus 20 of the present embodiment is constructed as a device capable of carrying out a games such as a race game. When the game apparatus 20 is activated, the control section 21 (CPU), according to programs stored in its ROM, reads the operating system (OS) stored in the ROM, into a system area set in the RAM 22. Next, the game program (i.e. race game) recorded in the CD-ROM 10 is read into a program area of the RAM 22 under control of the control section 21 according to the OS. Then the race game is carried out according to the procedures described below, under control of the control section 21 according to the game program on the RAM 22.

The control section 21 according to the game program first starts a process for alternately displaying a title screen and/or an opening screen on the display screen of the output device 30 while monitoring a state of a start button provided in the input device 25.

Namely, the control section 21 displays the title screen on the output device 30 by making use of graphic data for the title screen recorded in the CD-ROM 10, while monitoring the state of the start button. When detecting a lapse of a predetermined time, the control section 21 then makes the MDEC 26 start reproduction of movie data for the opening screen recorded in the CD-ROM 10. After completion of the reproduction of movie data, the title screen is displayed again.

Once the control section 21 detects depression of the start button, the control section 21 will start a race game, including displaying a race screen in which a specific car (moving body) acts in accordance with a player's manipulation on the input device 25.

Figure 2:
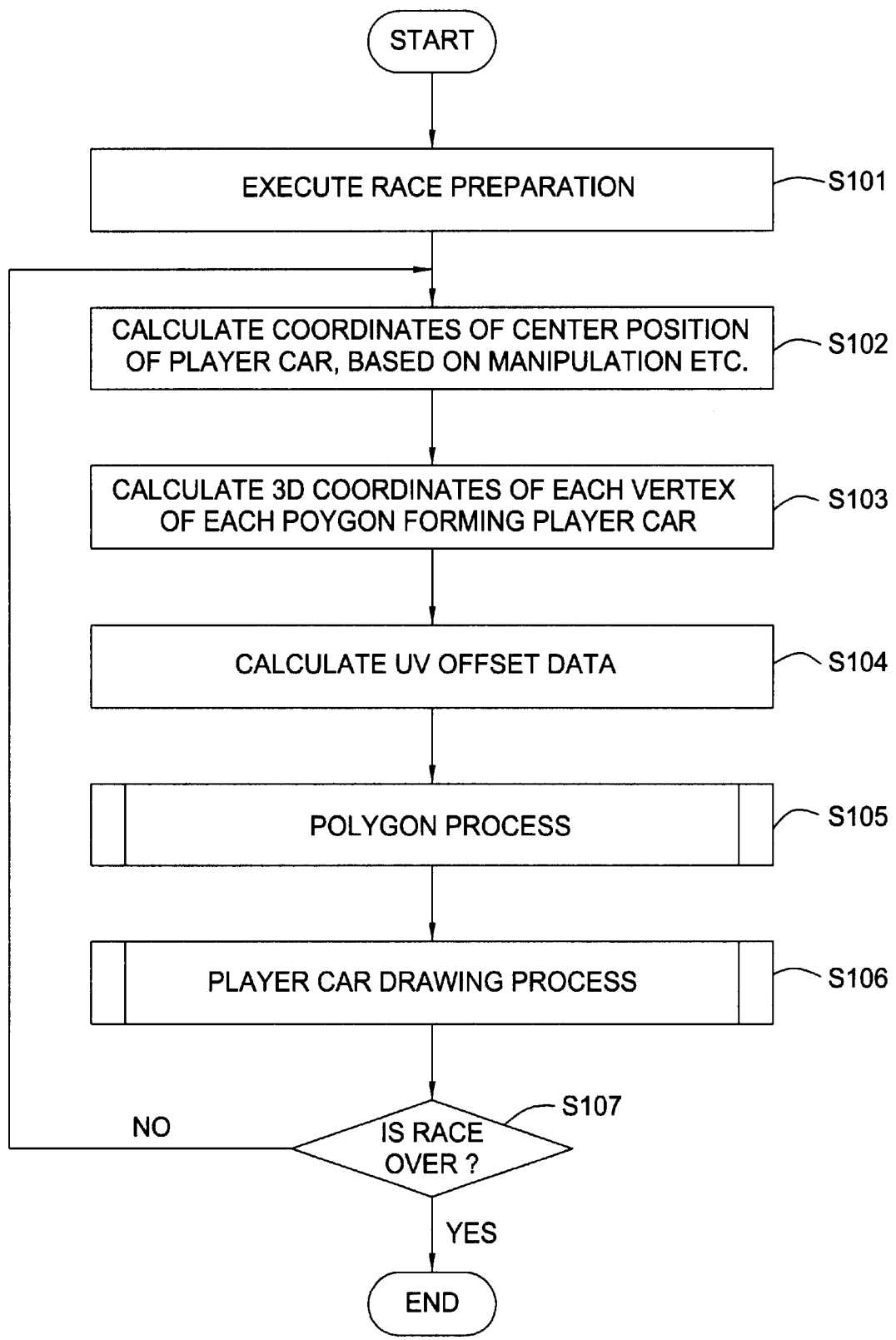
FIG. 2 is a flowchart to show procedures of the general operation of the game apparatus according to the embodiment.

FIG. 2 shows operation procedures of the control section 21 during a race process. As illustrated, at a start of the race process the control section 21 executes a race preparation (step S101).

In the race preparation, the control section 21 controls the graphic processing section 27 in response to user input instructions as to a race course used, a car (moving body) used, etc. from the player. Namely, the control section 21 causes a screen for data entry to be displayed on the display screen of the output device 30 and recognizes the instructions concerning the race course and car model to be used for the race, based on the player's manipulation on the input device 25. Then the control section 21 reads data required for carrying out the race under the instructed conditions from the CD-ROM 10 onto the RAM 22 and reserves a storage area of various data utilized in the processing, on the RAM 22.

Figure 3:
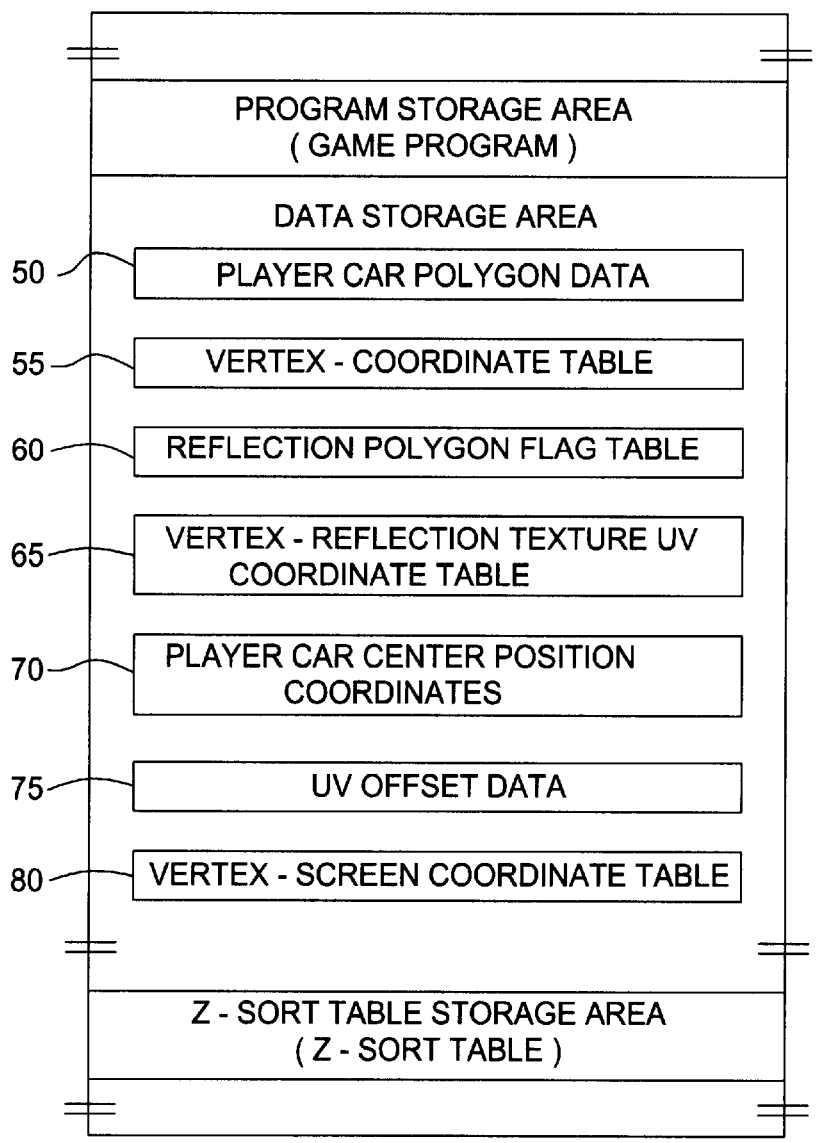
FIG. 3 is an explanatory diagram to explain a use form of RAM in the game apparatus according to the embodiment.

FIG. 3 shows principals of data (concerning the display of the player car) prepared on the RAM 22 during this preparation process. As illustrated, during the race preparation, a data storage area is prepared on the RAM 22, and prepared in the data storage area are player car polygon data 50, a vertex-coordinate table 55, a reflection flag table 60, a vertex-reflection texture UV coordinate (texture plane coordinate) table 65, player car center position coordinates 70, UV offset data 75, a vertex-screen coordinate table 80, and other data. The race preparation process also prepares in the data storage area is a Z-sort table storage area for storing a Z-sort table for management of a drawing order of polygons.

The player car polygon data 50, vertex-coordinate table 55, and reflection flag table 60, among the data prepared in the data storage area, are data read from the CD-ROM 10, and the remaining data may be prepared by the control section 21 (the structure of the data is defined in the game program).

Although omitted from the illustration in FIG. 3, the polygon data for race courses, performance data (acceleration, maximum speed, cornering performance data, etc.) used for computation of moving amount of car, character data to be displayed on the race screen, and sound effect data are also read onto the RAM 22 in the race preparation. Some texture images including a reflection texture image are also read from the CD-ROM 10 and stored in the frame buffer of the graphic processing section 27. Although specific utilization procedures will be described hereinafter, the reflection texture image comprises an image of 256×256 dots that when a portion thereof is superimposed in the form of a translucent image on a polygon of the player car, that portion resembles reflecting light from light sources (street lights, etc.) present on the course. The reflection texture image is an image having periods of 128 dots in each of U- and V-directions (wherein pixels at coordinates (u, v) are equal to those at coordinates (u+128, v), (u, v+128), and (u+128, v+128)).

Configurations of the player car polygon data 50, vertex-coordinate table 55, reflection flag table 60, vertex-reflection texture UV coordinate table 65, and vertex-screen coordinate table 80 will be described below referring to FIG. 4 to FIG. 7.

Figure 4:
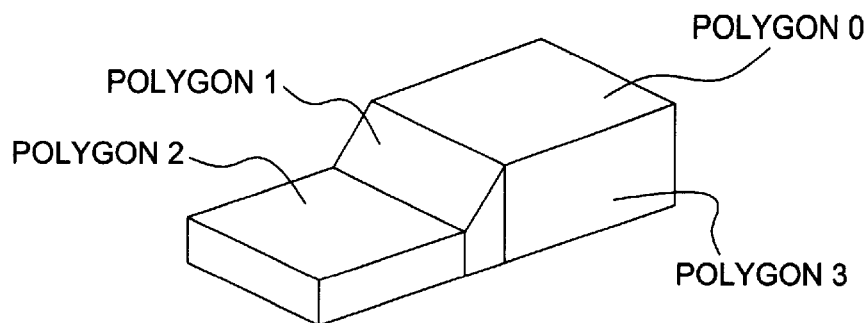
FIG. 4 is a schematic diagram for explaining the player car polygon data used in the game apparatus according to the embodiment.
Figure 5:
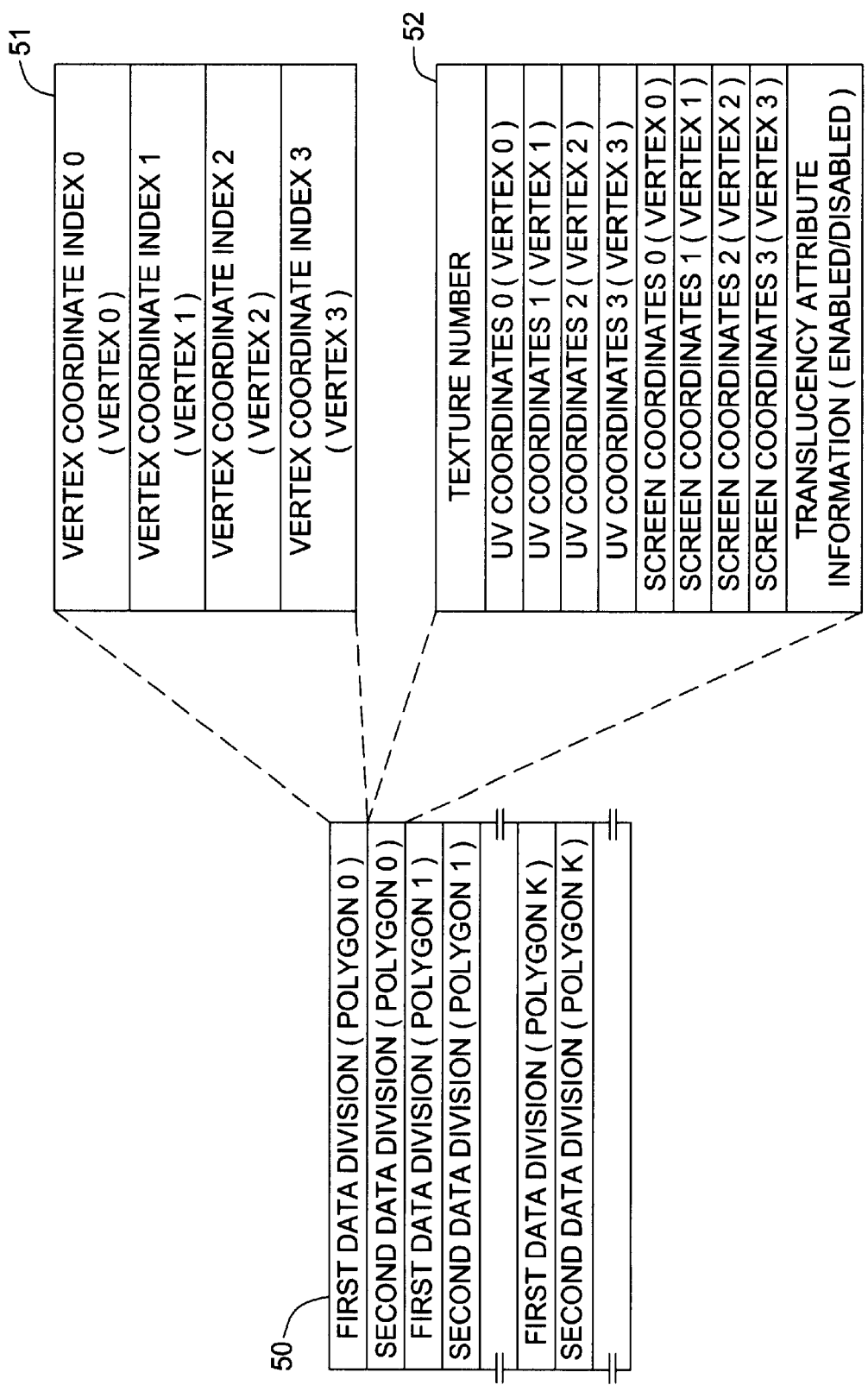
FIG. 5 is an explanatory diagram to explain the player car polygon data used in the game apparatus according to the embodiment.

FIG. 4 is a schematic diagram for explaining the player car polygon data used in the game apparatus according to the present embodiment. The player car polygon data 50 is model data for displaying the shape of the player car as a combination of many types of polygons, as schematically illustrated in FIG. 4. FIG. 5 is an explanatory diagram to explain the player car polygon data used in the game apparatus according to the present embodiment, and FIG. 6 is, similarly, an explanatory diagram to explain the vertex-coordinate table used. As illustrated in FIG. 5, the player car polygon data 50 includes a plurality of data pieces representing all of the polygons used for the player car. As shown in FIG. 5, data for each polygon (polygon 0 to polygon K) includes first data divisions 51 and second data divisions 52. A first data division 51 includes data defining the shape and position in a three-dimensional space for car, of one polygon forming the player car, which includes three or four vertex index values. A vertex index value is data that can be converted into coordinates of a vertex and a normal vector thereat by reference to the vertex-coordinate table 55. Namely, the vertex-coordinate table 55 is a table storing vertex coordinates and normal vectors in the form of correspondence to their respective index values, as schematically illustrated in FIG. 6.

A second data division 52 includes data that allows the graphic processing section 27 to draw a polygon, which includes, as illustrated in FIG. 5, a texture number, UV coordinates equal in the number to the number of vertex coordinate index values included in a corresponding first data division 51, screen coordinates (two-dimensional coordinates) equal in the number to the number of UV coordinates, and translucency attribute information as described below.

The texture number is data for specifying a position of a texture image used out of the plurality of texture images read into the frame buffer. The UV coordinates correspond to each vertex of a polygon and provide information for setting a region of a texture pasted on the polygon. The translucency attribute information is information to specify whether a texture image is to be pasted as a translucent image (i.e., whether it is pasted in such a form as to allow a texture image present under to be seen through the translucent image), and the translucency attribute information in most of the second data divisions 52 included in the player car polygon data 50 is set to "disabled," which indicates no translucency effect.

The screen coordinates in the second data divisions 52 are data used in drawing polygons onto the frame buffer by the graphic processing section 27. The screen coordinates are information which is read onto the RAM 22 in the race preparation and is utilized after their values of the screen coordinates has been changed. That is, the player car polygon data 50 stored in the CD-ROM 10 is data including the second data divisions 52 in which dummy data of predetermined size is set as screen coordinates.

FIG. 7 is an explanatory diagram to explain the reflection flag table used in the game apparatus according to the present embodiment. As illustrated, the reflection flag table 60 is a table in which, for each of the polygons constituting the car, a reflection flag of either 1 or 0 to specify whether the polygon of interest is one on which the reflection texture image is to be pasted (hereinafter referred to as a reflection polygon), is set.

As illustrated in FIG. 8, the vertex-reflection texture UV coordinate table 65 is a table storing UV coordinates in the form of correspondence to the index values. Prepared in the race preparation process is the vertex-reflection texture UV coordinate table 65 in which dummy coordinates are set for all the UV coordinates.

FIG. 9 is an explanatory diagram to explain the vertex-screen coordinate table used in the game apparatus according to the present embodiment. As illustrated, the vertex-screen coordinate table 80 is a table storing screen coordinates in the form of correspondence to the index values. Prepared in the race preparation process is the vertex-screen coordinate table 80 in which dummy coordinates are set for all the screen coordinates.

Returning to FIG. 2, the description of the operation of the control section 21 will be continued. After completion of the race preparation process, the control section 21 computes player car center position coordinates (ox, oy, oz) 70 (in FIG. 3), which are data to indicate the position of the center of the player car in a course coordinate system, and stores the center position coordinates on the RAM 22 (step S102). The computation of the player car center position coordinates 70 in this step is carried out based on player's manipulation input through the input device 25 between previous computation and present computation of player car center position coordinates, the player car center position coordinates computed in the previous computation, the car performance data of the player car, and so on.

Then the control section 21 computes three-dimensional space coordinates of the respective vertices of each of the polygons constituting the player car by reference to the vertex-coordinate table 55, based on the player car center position coordinates 70, and thus computed and based on the vertex index values in each of the first data divisions 51 in the player car polygon data 50 (step S103). Further, the control section 21 computes UV offset data (Uoff, Voff) 75, based on the player car center position coordinates 70 computed (step S104). The use thereof will be detailed hereinafter, but Uoff, Voff, which are elements of UV offset data 75, are values obtained by adding 64 to each of two kinds of integers represented by lower seven bits of the X, Z coordinate values of the player car center position coordinates (ox, oy, oz) 70.

After computation of the UV offset data 75, the control section 21 carries out a polygon process (step S105) and a player car drawing process (step S106).

Figure 10:
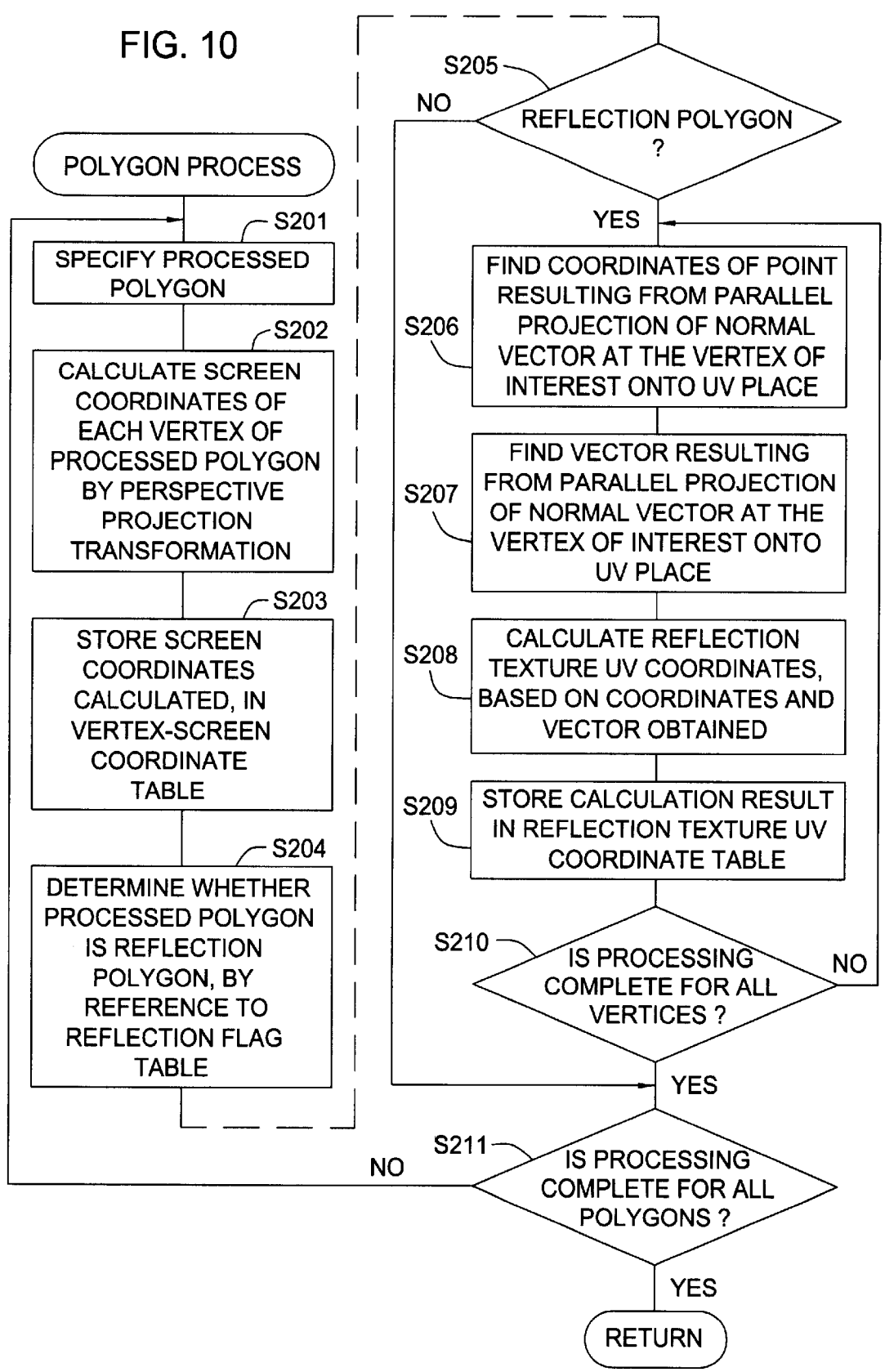
FIG. 10 is a flowchart of the polygon process carried out in the game apparatus according to the embodiment.

FIG. 10 is a flowchart of the polygon process. As illustrated, in the polygon process the control section 21 first specifies one polygon to be processed (hereinafter referred to as a processed polygon) (step S201). Then the control section performs a perspective projection transformation with the coordinates of the respective vertices of the processed polygon (which were computed in step S103), thereby computing screen coordinates of the respective vertices of the processed polygon (step S202). Thereafter, the control section 21 stores the computed screen coordinates of the respective vertices in the vertex-screen coordinate table 70 (step S203). Then the control section determines whether the processed polygon is a reflection polygon or not, by referencing the reflection flag table 60 (step S204).

When the processed polygon is not a reflection polygon (step S205; NO), the control section 21 determines whether the process has been completed for all the polygons (step S211). When the process is not completed for all the polygons yet (step S211; NO), the control section returns to step S201 to carry out the process for the next polygon.

Referring back to Step S205, when the processed polygon is a reflection polygon (step S205; YES), the control section 21 obtains coordinates of a point resulting from parallel projection of a vertex of the processed polygon at a preset factor κ onto the UV plane (a plane parallel to the XZ plane) (step S206). The control section also obtains a vector resulting from parallel projection of a normal vector at the vertex of interest, at a preset factor y onto the UV plane (step S207). Then the control section computes the texture UV coordinate values concerning the vertex under processing, based on the coordinates and vector obtained (step S208).

Specifically, the following operations are carried out in these steps. When the coordinates of the vertex to be processed are denoted by (a, b, c) and the normal vector thereat by (na, nb, nc), coordinates (a', c') of a vertex on the UV plane are computed according to the equation of (a', c')=((a, c)−(ox, oz))×κ in the process of step S206. In next step S207, a vector (na', nc') as a result of projection onto the UV plane is obtained according to the equation of (na', nc')=(na, nc)×γ, and in step S208 the texture UV coordinates (u, v) are computed according to the equation of (u, v)=(a', c')+(na', n')+(Uoff, Voff).

After that, the control section 21 updates the texture UV coordinate values in the vertex-reflection texture UV coordinate table 65 concerning the corresponding vertex, using the texture UV coordinate values computed (step S209). Then the control section determines whether the processing is completed for all the vertices of the processed polygon (step S210). When the processing is not completed for all the vertices (step S210; NO), the control section returns to step S206 to start the processing for the next vertex. On the other hand, when the processing is completed for all the vertices (Step S209; YES), the control section terminates the loop processing of steps S206 to S210 and then proceeds to step S211.

When the processing is not completed for all the polygons yet (step S210; NO), the control section 21 then returns to step S201 to start the processing for the next polygon. When the processing is completed for all the polygons (step S211; YES), the control section terminates the polygon process and then starts the player car drawing process.

Figure 11:
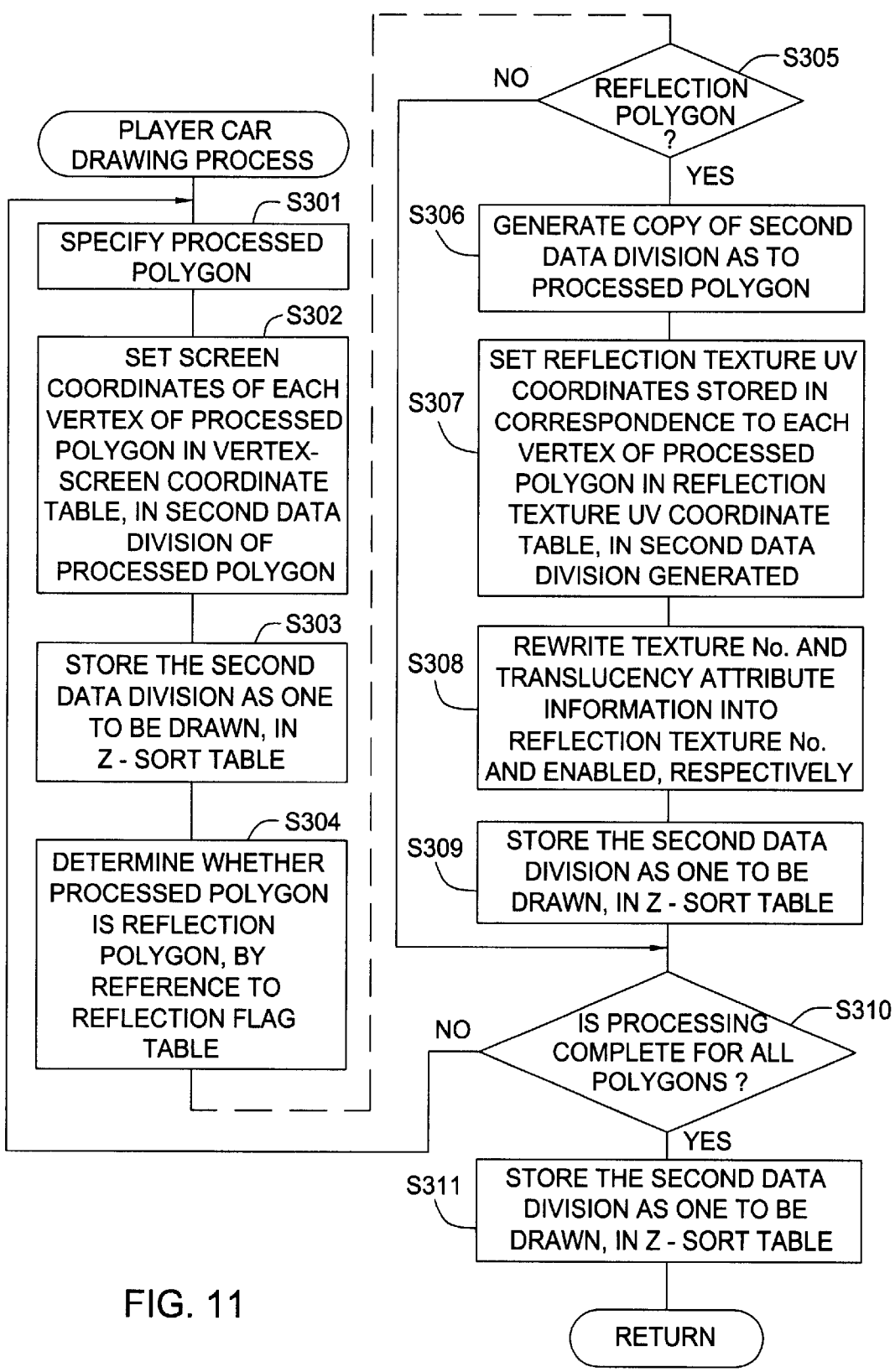
FIG. 11 is a flowchart of the player car drawing process carried out in the game apparatus according to the embodiment.

FIG. 11 shows a flowchart of the player car drawing process. As illustrated, during the player car drawing process, the control section 21 first specifies a processed polygon (step S301) and then sets screen coordinate values of respective vertices of the processed polygon stored in the vertex-screen coordinate table, in the second data division concerning the processed polygon (step S302). Then the control section stores the second data division with the screen coordinate values thus set, as a second data division to be used for drawing, in the Z-sort table (step S303).

After that, the control section 21 checks whether the processed polygon is a reflection polygon or not, by referencing the reflection flag table 60 (step S304). When the processed polygon is not a reflection polygon (step S305; NO), the control section 21 determines whether the processing has been completed for all the polygons (step S310). When the process is not completed for all the polygons yet (step S310; NO), the control section returns to step S301 to start the processing for the next polygon.

When the processed polygon is a reflection polygon (step S305; YES), the control section 21 generates a copy of the second data concerning the processed polygon, in a predetermined storage area of the RAN 22 (step S306). Then the control section sets in the second data generated, UV coordinate values concerning each vertex of the processed polygon stored in the vertex-reflection texture UV coordinate table (step S307). The control section also rewrites the texture number in the second data into the reflection texture number (the texture number indicating the reflection texture image) and rewrites the translucency attribute information into "enabled" (information indicating change into translucency) (step S308). Then the control section stores the second data to be used for drawing, in the Z-sort table (step S309).

After that, the control section 21 proceeds to step S310 to determine whether the processing is completed for all the polygons. When it is not completed yet (step S310; NO), the control section returns to step S301 to start the processing for the next polygon. On the other hand, when the processing as described above has been completed for all the polygons (step S310; YES), the control section sends a command to start the drawing process to the graphic processing section 27 (step S311).

Then the control section 21 terminates the player car drawing process. As illustrated in FIG. 3, if the race is not ended (step S107; NO), the control section returns to step S102 to start the process for display of the next race screen. When the race is ended (step S107; YES), the control section terminates the processing illustrated.

Figure 12:
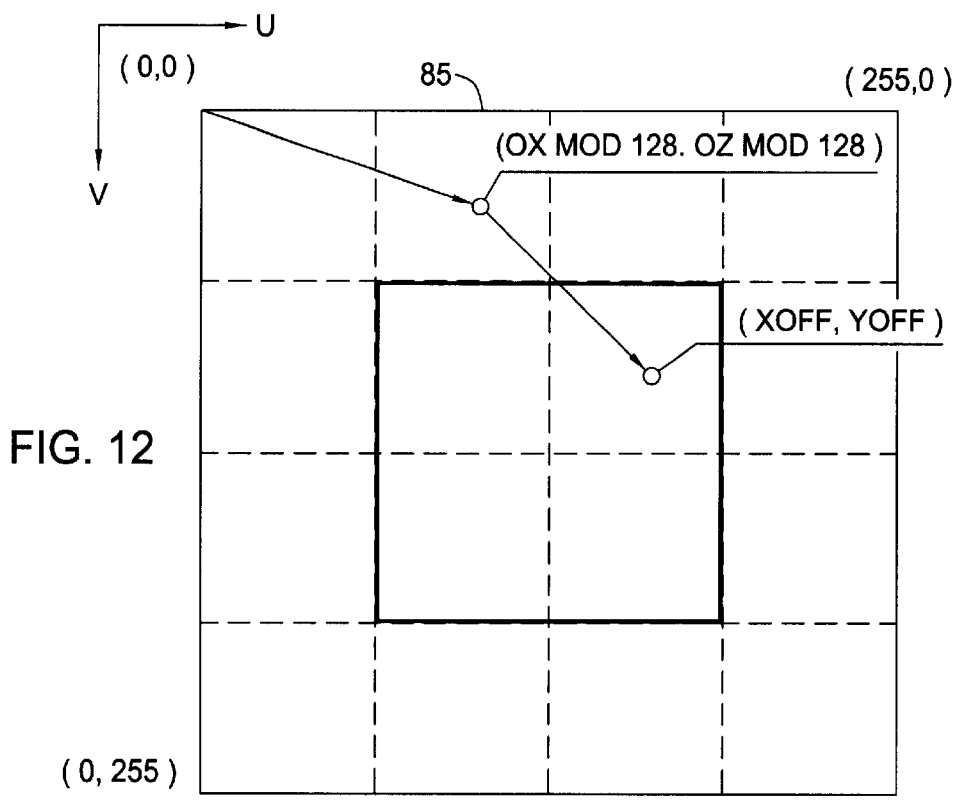
FIG. 12 is an explanatory diagram to explain the UV offset data computing procedure in the game apparatus according to the embodiment.
Figure 13:
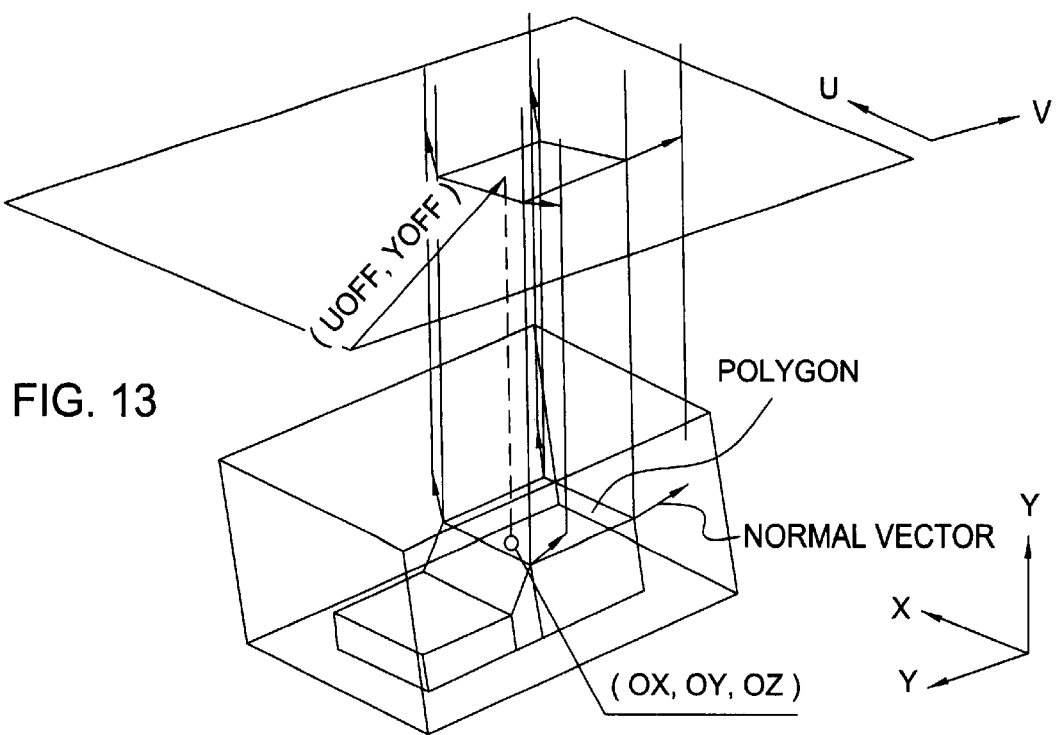
FIG. 13 is an explanatory diagram to explain the UV coordinate value computing procedure in the game apparatus according to the embodiment.
Figure 14:
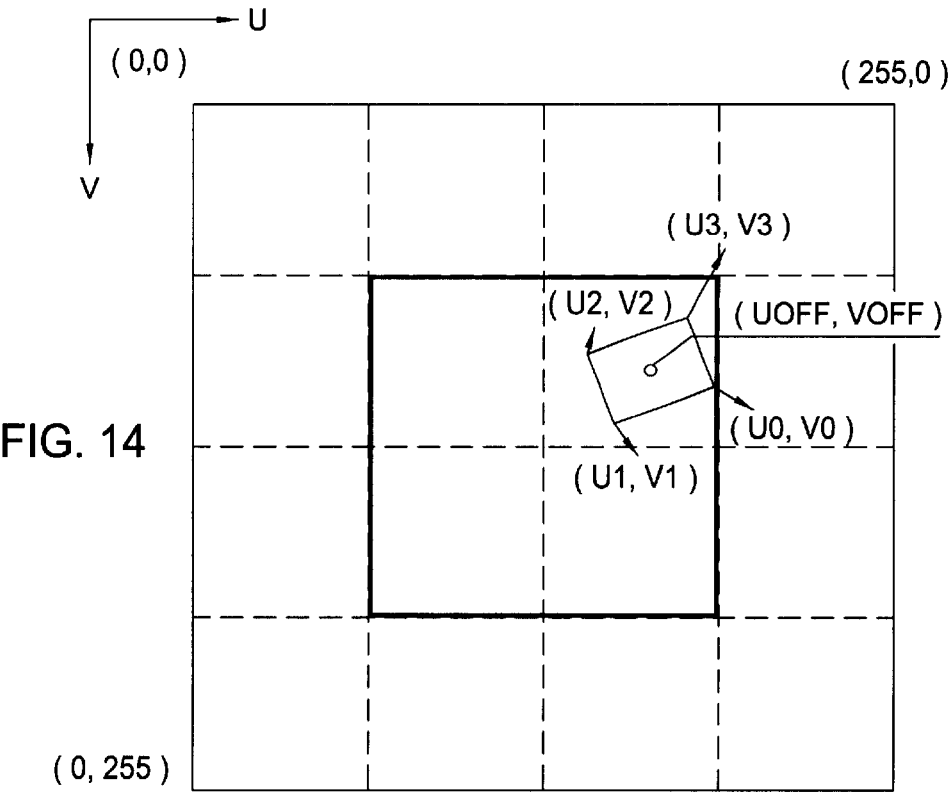
FIG. 14 is an explanatory diagram to explain the UV coordinate value computing procedure in the game apparatus according to the embodiment.
Figure 15:
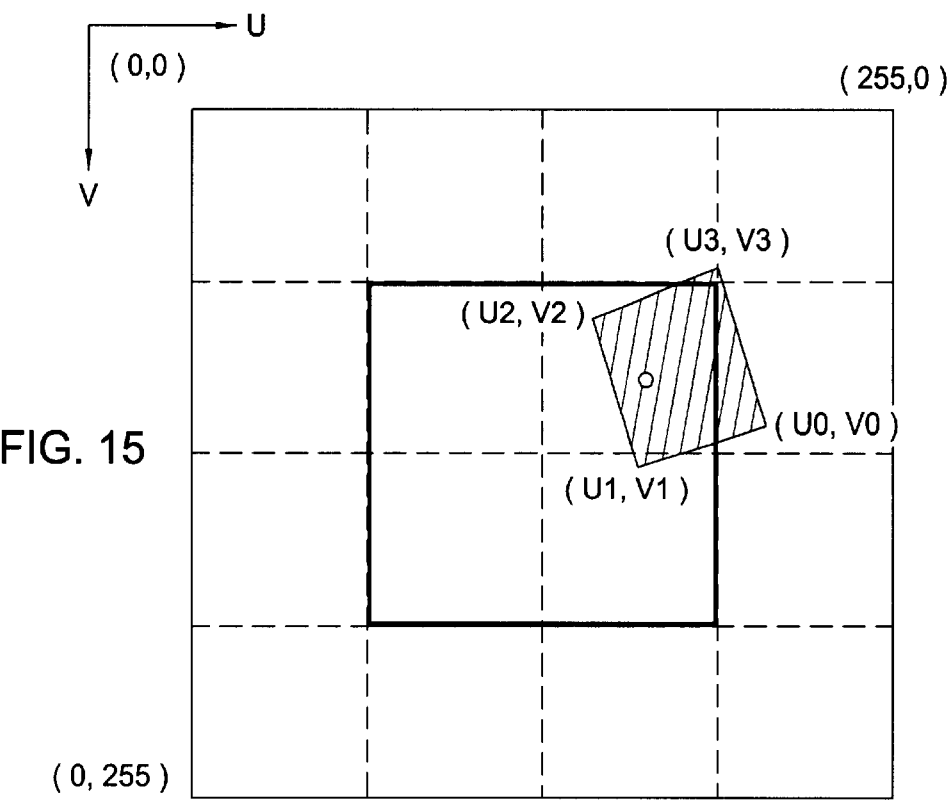
FIG. 15 is an explanatory diagram to explain the UV coordinate value computing procedure in the game apparatus according to the embodiment.

The details (meanings) of the above-stated processing will be described more specifically by reference to FIGS. 12 to 17. FIG. 12 is an explanatory diagram to explain the UV offset data computation procedure in the game apparatus according to the present embodiment, and FIG. 13 to FIG. 15 are explanatory diagrams to explain the UV coordinate computation procedure in the game apparatus according to the present embodiment. FIGS. 16A–16D show steps of an explanatory drawing to explain the display procedure (display principle) of the player car in the game apparatus according to the present embodiment, and FIGS. 17A–17C are explanatory diagrams to explain game screens displayed in the game apparatus according to the present embodiment.

As described previously, the UV offset data (Uoff, Voff) 75 are the values obtained by adding 64 to each of the two kinds of integers represented by the lower seven bits of the X, Z coordinate values of the player car center position coordinates (ox, oy, oz) 70. Namely, (Uoff, Voff) are data resulting from addition of (64, 64) to the lower 7-bit values (ox mod 128, oz mod 128) of the X, Z coordinate values of the player car center position data (ox, oy, oz), as schematically illustrated in FIG. 12, and are data that can take values (64 to 191) in the range indicated by the solid frame in the reflection texture image 85 being the image of 128×128 dots.

The operations in steps S206 to S209 of FIG. 10 are carried out to obtain UV coordinates of respective vertices as a result of parallel projection of a polygon (a reflection polygon) forming the player car onto the UV plane and vectors as a result of parallel projection of respective normal vectors onto the UV plane. These operations also obtain coordinates of points each present at a position the length of the corresponding obtained vector apart from the associated point indicated by the UV coordinates of each vertex obtained, in the UV coordinate system in which a point as a result of parallel projection of the player car center position coordinates (ox, oy, oz) 70 onto the UV plane is the point indicated by the UV offset data (Uoff, Voff) 75, as schematically illustrated in FIGS. 13 and 14.

In the processing of steps S307 to S309 of FIG. 11, as schematically illustrated in FIG. 15, data to draw over the reflection polygon a translucent polygon on which an area (the hatched area) of the reflection texture image having the vertices as the result of the operations in steps S206 to S209 is pasted, is produced by making use of the screen coordinates in the second data concerning the reflection polygon.

Figure 16A:
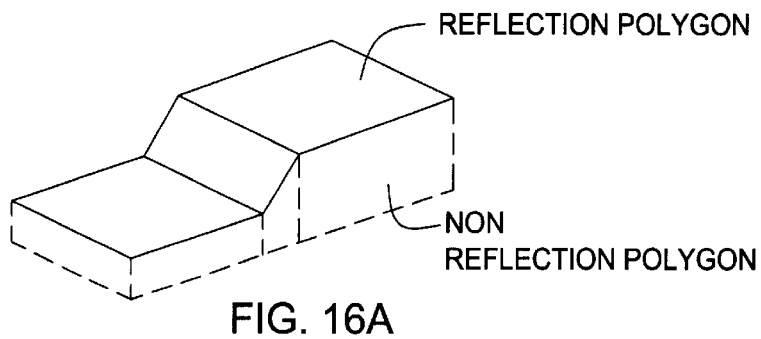
FIGS. 16A–16D show steps of a explanatory diagram to explain the display procedure of the player car in the game apparatus according to the embodiment.
Figure 16B:
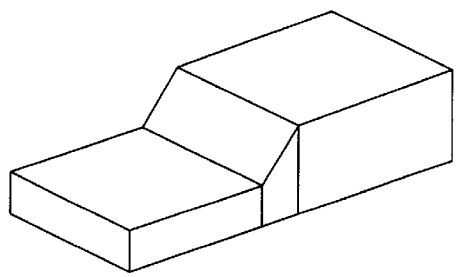

For example, when the player car defined by the player car polygon data 50 and reflection flag table 60 is the one as illustrated in FIG. 16A, the apparatus prepares the data to draw a graphic image as illustrated in FIG. 16B, based on the second data divisions (including the screen coordinates set) originally included in the player car polygon data 50.

Figure 16C:
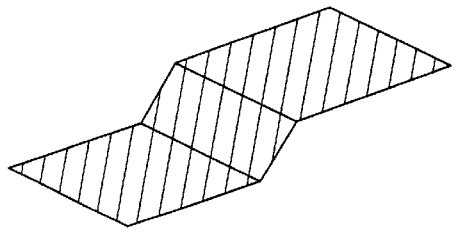
Figure 16D:
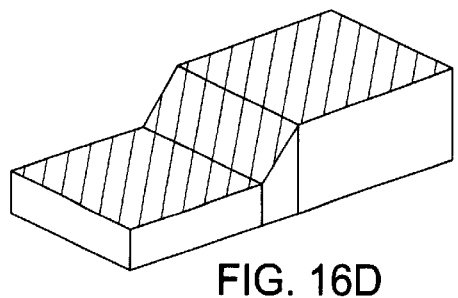

Further, a copy of the second data divisions with the screen coordinates set is prepared as to the reflection polygons. Then data for the copy is prepared, including setting of the reflection texture number translucency attribute, and reflection texture UV coordinates determined based on the player car center position coordinates, i.e., data to effect the drawing as illustrated in FIG. 16C. Since the drawing of FIG. 16C is made on a translucent basis, the player car displayed on the display screen of the output device 30 as the result of execution of step S309 eventually becomes one in which a translucent polygon (on which part of the reflection texture image is pasted) is superimposed on each portion designated as a reflection polygon, as schematically shown in FIG. 16D.

The area of the reflection texture image used in the generation of translucent polygon is varied according to the player car center position coordinates. Namely, when a screen in which the player car is running in the direction of depth and in which the view point follows the position of the player car is displayed on the display screen, the display shows a pattern that moves opposite to the moving direction of the player car relative to the race course, on the surface of the player car.

The reflection texture image is the image having periods of 128 dots in each of the U- and V-directions (wherein pixels at coordinates (u, v) are equal to those at coordinates (u+128, v), (u, v+128), and (u+128, v+128)), whereby the substance of the reflection texture image pasted on the translucent polygon is prevented from discontinuously varying, even if Uoff (or Voff) varies from 191 to 64 (or from 64 to 191) with change in the player car center position coordinates.

As detailed above, the present game apparatus is an apparatus capable of displaying the ambient light pattern moving in accordance with movement of the player car on the surface of the player car no matter how the player car moves. Namely, the apparatus is constructed so as to be able to display the image appearing as if the player car is running actually in the streets. Since the pasted reflection texture image is also takes the normal vectors into consideration, the apparatus functions as a device that can also present reflection of a curved portion with improved realism.

The game apparatus described in one embodiment provides the reflection expression of ambient light on the player car. The present invention can also be applied to cars and objects other than the player car (for example, to rival cars, or other cars manipulated by other players). Further, an object of the reflection expression of ambient light does not have to be a car, and the present invention can also be applied to any moving object moving in the three-dimensional space and constructed of polygons.

The game apparatus according to one embodiment draws the polygons by Z-sort, but the polygon drawing procedure as contemplated by the present invention is not limited to the Z-sort. For example, the present invention may also be carried out by performing the polygon drawing procedure utilizing a Z-buffer, for example.

The game system of one embodiment is realized by making the game apparatus of the ordinary structure carry out the game program recorded in the CD-ROM, but the technology of the present invention can also be applied to any apparatus carrying out the display of images using polygons, e.g., to general purpose computers, such as personal computers or the like, and arcade game machines. Further, the present invention may also be implemented by use of a communication terminal such as a cellular phone, a portable remote terminal, a car navigation system, or the like. A medium in which the program is recorded may also in a medium other than the CD-ROM, including a floppy disk, an MO ( ), or the like.

Further, the game apparatus may also be constructed to allow the programs to be are entered (or installed) via the communication line 33. The programs and data entered through the communication line 33 can be received from a host device via the network 100 in the form of a carrier wave frequency-modulated or phase-modulated according to data streams thereof and can be used while being stored in the respective storage areas of the RAM 22 as occasion arises.

Further, the game programs and data can also be provided in the form of use in which they are received as packets from the host device connected via the communication line 33 and the network 100.

The programs and data for substantiating the present invention may also be provided in the preinstalled form in the game apparatus or in the computers.

The game programs and data may also be compressed and/or encrypted for transmissions.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A game apparatus for displaying a game image having a moving body moving in a virtual space, said game apparatus comprising:
   a polygon data memory for storing polygon data which define shapes of polygons constituting said moving body;
   a texture image memory for storing a texture image which indicates a reflected state of ambient light;
   a position specifying unit for specifying a position of said moving body in said virtual space; and
   a first image drawing unit for drawing a polygon based on said position of said moving body and said polygon data;
   a determination unit for determining a part of said texture image stored in said texture image memory based on said specified position of the moving body; and
   a second image drawing unit for drawing a translucent polygon over said polygon of said moving body, said translucent polygon having pasted thereon said part of said texture determined by said determination unit.

2. The game apparatus according to claim 1, wherein said polygon data memory stores the polygon data to define the shapes of the polygons by coordinates of respective vertices and normal vectors at the respective vertices.

3. The game apparatus according to claim 1, wherein said texture image memory stores a texture image in which a plurality of pixels are equal to each other at places spaced by a first predetermined distance in a first predetermined direction and in which a plurality of pixels are equal to each other at places spaced by a second predetermined distance in a second predetermined direction,
   said game apparatus further comprising computing unit for calculating reference coordinates, based on the position specified position, utilizing a procedure of yielding identical results at regular intervals in each change of said position along said first predetermined direction by the first predetermined distance and each change of said position along said second predetermined direction by the second predetermined distance,
   wherein said second image drawing unit determines the portion of said texture image pasted on said translucent polygon, based on the reference coordinates calculated by said computing unit.

4. A game apparatus for displaying a game image in which a moving body moves in a virtual space, comprising:
   a processor configured to display said moving body in a form in which a translucent image indicating a reflected state of ambient light is superimposed on a surface of said moving body and in which the reflected state of ambient light moves in accordance with movement of said moving body.

5. A game image display method for displaying a moving body moving in a virtual space, said game image display method comprising:

specifying a position of said moving body in said virtual space; and drawing a polygon based on said specified position of said moving body and polygon data defining shapes of a plurality of polygons constructing said moving body; and drawing, over a predetermined polygon of said moving body, a translucent polygon having the same shape as said predetermined polygon, wherein the translucent polygon includes a texture image indicating a reflected state of ambient light pasted thereon according to said specified position.

6. The method according to claim 5, wherein said polygon data to define the shapes of the polygons by coordinates of respective vertices and normal vectors at the respective vertices.

7. The method according to claim 5, wherein said texture image is an image in which a plurality of pixels are equal to each other at places spaced by a first predetermined distance in a first predetermined direction and in which a plurality of pixels are equal to each other at places spaced by a second predetermined distance in a second predetermined direction; said method further comprises:

calculating reference coordinates, based on the specified position, utilizing a procedure of yielding identical results at regular intervals in each change of said position along said first predetermined direction by said first predetermined distance and each change of said position along said second predetermined direction by said second predetermined distance; and wherein said texture image pasted on said translucent polygon is determined based on the calculated reference coordinates.

8. A computer-readable storage medium storing a program for causing a computer to display a game image in which a moving body moves in a virtual space, said program causing computer to perform a process comprising:

specifying a position of said moving body in said virtual space; and drawing a polygon based on said specified position of said moving body and polygon data defining shapes of a plurality of polygons constructing said moving body; and drawing, over a predetermined polygon of said moving body, a translucent polygon having the same shape as said predetermined polygon, wherein the translucent polygon includes a texture image indicating a reflected state of ambient light pasted thereon according to said specified position.

9. The computer-readable storage medium according to claim 8, wherein said polygon data is the polygon data to define the shapes of the polygons by coordinates of respective vertices and normal vectors at the respective vertices.

10. A computer data signal embodied in a transmission medium, said computer data signal containing a game program for displaying a game image in which a moving body moves in a virtual space, wherein said game program causes a computer to perform a process comprising:

specifying a position of said moving body in said virtual space; and drawing a polygon based on said specified position of said moving body and polygon data defining shapes of a plurality of polygons constructing said moving body; and drawing, over a predetermined polygon of said moving body, a translucent polygon having the same shape as said predetermined polygon, wherein the translucent polygon includes a texture image indicating a reflected state of ambient light pasted thereon according to said specified position.

11. The computer data signal according to claim 10, wherein said computer data signal is a compressed computer data signal.

12. The computer data signal according to claim 10, wherein said computer data signal is an encrypted computer data signal.

13. A computer program product for displaying a game image in which a moving body moves in a virtual space, said computer program product comprising:

computer code for specifying a position of said moving body in said virtual space; and computer code for drawing a polygon based on said specified position of said moving body and polygon data defining shapes of a plurality of polygons constructing said moving body; and computer code for drawing, over a predetermined polygon of said moving body, a translucent polygon having the same shape as said predetermined polygon, wherein the translucent polygon includes a texture image indicating a reflected state of ambient light pasted thereon according to said specified position.

* * * * *

UNITED STATES PATENT AND TRADEMARK OFFICE
CERTIFICATE OF CORRECTION

PATENT NO.      : 6,518,967 B1                                              Page 1 of 1
DATED           : February 11, 2003
INVENTOR(S)     : Iwasaki It is certified that error appears in the above-identified patent and that said Letters Patent is hereby corrected as shown below:

<u>Column 9,</u>
Line 47, please change "RAN" to -- RAM --.

Signed and Sealed this

Sixth Day of May, 2003

JAMES E. ROGAN
*Director of the United States Patent and Trademark Office*